United States Patent [19]
Gower

[11] Patent Number: 5,216,203
[45] Date of Patent: Jun. 1, 1993

[54] ELECTRICAL JUNCTION BOX

[76] Inventor: Edward E. Gower, Rte. 4, Box 40, Clarksburg, W. Va. 26301

[21] Appl. No.: 846,079

[22] Filed: Mar. 5, 1992

[51] Int. Cl.⁵ .................. H02G 3/18; H01B 17/26
[52] U.S. Cl. ................ 174/65 R; 174/152 G; 174/153 G
[58] Field of Search ........... 174/65 R, 152 G, 153 G, 174/48, 49, 53, 65 G

[56] References Cited

U.S. PATENT DOCUMENTS

| | | |
|---|---|---|
| 1,271,215 | 7/1918 | Platt . |
| 2,947,435 | 8/1960 | Vocht . |
| 3,075,487 | 1/1963 | Appleton . |
| 3,083,857 | 4/1963 | Clark ............................ 220/3.94 |
| 3,392,228 | 7/1968 | Zerwes ............................ 174/52 |
| 3,724,706 | 4/1973 | Slocum .......................... 220/3.8 |
| 3,907,772 | 7/1976 | Ballard .......................... 174/53 |
| 4,626,617 | 12/1986 | Rye ............................. 174/65 G |
| 4,654,470 | 3/1987 | Feldman et al. ................. 174/50 |
| 5,008,491 | 4/1991 | Bowman ....................... 174/48 |

Primary Examiner—Harold Broome
Attorney, Agent, or Firm—Michael K. Gray

[57] ABSTRACT

An electrical junction box having a plurality of holes into which are inserted hole cushions which are fitted to the periphery of the holes to protect electrical wires entering the junction box from the bare edges which form the holes. Top and bottom insulated cushions further protect the electrical wires from contacting interior sides of the top and floor of the junction box. Wire guards are provided which surround the insulated electrical wires to allow the insulated wires to be secured by clamping means to the electrical junction box without the electrical wires actually coming into direct contact with the clamping means.

5 Claims, 2 Drawing Sheets

ELECTRICAL JUNCTION BOX

BACKGROUND OF THE INVENTION

1. Field of the Invention

The present invention relates to electrical junction boxes. More particularly, the present invention pertains to an improved electrical junction box and method for making the same. The electrical junction box of the present invention is provided with cushion holes (rubber grommets). The cushion holes are inserted through holes located on the sidewall of the junction box for purposes of insulating and protecting electrical wires which otherwise would be exposed to the sharp and bare edges which form the peripheries of the holes. Also, the junction box of the present invention is provided with insulation pads which are located at inner top and inner bottom locations of the junction box. The insulation pads insulate the electrical wires from the top and bottom of the junction box and protect the wires from being compressed directly against the top and bottom of the junction box. In addition, vinyl plastic sleeves (wire guards) are provided for each electrical wire which is secured to the junction box by a clamping means. The vinyl plastic sleeves prevent the clamping means from penetrating the insulative coating of the electrical wires. Thus, electrical shorts are prevented.

2. Discussion of the Background

Electrical junction boxes were virtually coincident with the advent of electricity being introduced into homes and businesses. In that homes and businesses burn every day as a result of faulty wiring with losses to life and property, one cause of these fires need not be electrical junction boxes.

Electrical junction boxes are used for purposes of wiring electrical systems. Holes in the sides of the junction boxes provide an entry and exit for a plurality of wires which function as the electrical conduits for any number of electrical loads. These wires are often clamped to the box for securing purposes. However, the holes which provide entry of the wires to the box and the clamps which secure the wires to the box can be a source of potential danger and electrically induced fire.

The peripheral edges which form the holes in the sides of the junction box typically expose the wires which enter the junction box to naked, sharp surfaces which are capable of cutting through the wire insulation and causing a short in the electrical system. Clamps of various types are used in electrical junction boxes and these clamps often have sharp surfaces which are compressed against the electrical wires. As a result, the clamps have a potential for shorting the electrical wires which they secure. Furthermore, some types of clamping devices are inserted through the holes in the junction box and secured thereto by means of annular threads and wing nuts. These annular threads can be sharp so as to pose yet another potential hazard to the wires.

Typically, junction boxes have a detachable top so that wires can be installed in the junction box. After installation of the wires to the box, the top of the junction box is secured by screws or the like to the body of the junction box. When the top of the junction box is fastened to the junction box, the wires inside of the box may be exposed to significant compressive forces. The interior side of the top of the junction box and the interior side of the bottom of the junction box may have rough surfaces which, when compressed against the electrical wires for significant periods of time, can penetrate the insulation of the electrical wires with undesirable consequences.

Junction boxes are often placed in locations in a house, trailer, or business (i.e., ceilings, attics, etc.) such that the junction boxes are exposed to wide temperature differentials. Such changes in temperature cause an expansion and contraction in the materials which comprise the junction box and can further contribute to possible shorting of the wiring. Furthermore, time and temperature, in some instances, can make the insulation surrounding the wiring more prone to deterioration which can result in further undesirable consequences.

In recent years the trend has been to use composite plastic junction boxes. Such boxes, no doubt, are easily manufactured and mass produced through the use of appropriate molds. However, sharp peripheral edges can be present in plastic junction boxes just as in metal junction boxes, and the problems of clamping are not eliminated by plastic junction boxes. Furthermore, exposure to time and to temperature extremes can cause the plastic to become brittle and crack which can produce still more sharp edges for possible exposure to the wiring.

In addition, the use of a plastic junction box necessitates that an additional wire be run throughout the electrical system to act as a ground. Thus, in the case of plastic junction boxes, it is important that no break occur along the entire length of the grounded wire. In metal junction boxes, the junction box itself can, of course, be used as a ground. Furthermore, short circuits are much more dangerous in a plastic junction box.

For example, a short circuit might occur in a plastic junction box which creates a resistance which is not sufficient to trip the short circuit breaker. As heat builds up, the flammable plastic can catch fire with the resultant deleterious consequences.

Therefore, metal junction boxes are preferable over plastic junction boxes. A shopping comparison will reveal that little difference exists between the cost of plastic boxes and metal junction boxes.

In light of the above, it is apparent that a need exists for a junction box which has added protection for wires which enter the holes in the junction box. Further, a need exists for a junction box which protects the electrical wires from shorting when exposed to clamping and compressive forces.

SUMMARY OF THE INVENTION

Accordingly, one object of the present invention is to provide a junction box which will provide improved protection to wiring and prevent electrical fires.

Yet another object of the present invention is to provide a package for such an electrical junction box which can be supplied and easily assembled by consumers.

Still another object of the present invention is to provide a method of assembling an improved electrical junction box.

These and other valuable objects and advantages of the present invention are provided by an electrical junction box according to the present invention having a structure which is provided with a plurality of holes for the purpose of inserting insulated electrical wiring into the junction box. Hole cushions are provided which are inserted into the holes of the junction box, the hole cushions are annular and contact the periphery of the holes to protect the electrical wires, which extend through the hole cushions, from the sharp and bare edges which form the holes of the structure.

A wire guard is provided into which an electrical wire is inserted, at least one portion of the wire guard extends into the interior of the structure. A clamping means attached to the structure contacts the wire guard and secures the electrical wire to the structure. A bottom interior insulation pad is provided which is located between the floor of the junction box and the electrical wires to provide further protection to the electrical wires. A top is fastened to the structure. The top detachable to allow access to the interior of the structure. An interior top insulation pad is located between the electrical wiring and the top.

A component package according to the present invention is comprised of a structure having sidewalls and a floor. A bottom insulation pad is provided which is insertable over the interior of the floor of the structure. Hole cushions are provided which are insertable into holes which are formed in the sidewalls. The component package further includes a top which is attachable to the sidewalls of the structure so as to enclose the interior of the junction box. When the top is detached from the sidewalls, the interior of the junction box is exposed. A tubular wire guard is provided into which an electrical wire can be inserted. A clamping device is attachable to the structure and connectable to the wire guard in such a manner that the electrical wire is secured to the electrical junction box. An interior top insulation pad is postionable between the electrical wires and the top, the top being connectable to the sidewalls so as to enclose the structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

When referring to the drawings, it should be understood that like reference numerals designate identical or corresponding parts throughout the respective figures.

THE DETAILED DESCRIPTION OF THE INVENTION

Figure 1:
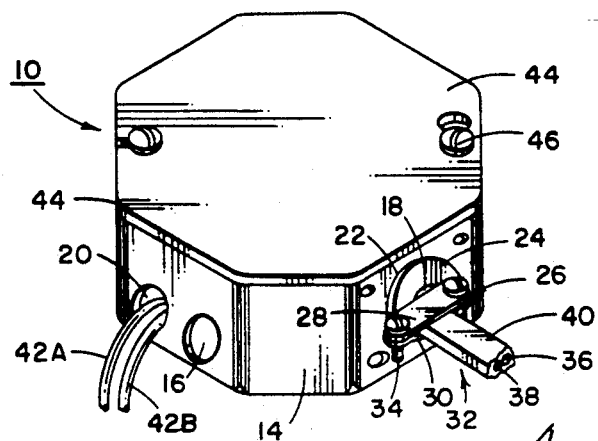
FIG. 1 is a perspective illustration of a prior art junction box.

With reference to FIG. 1, a prior art electrical junction box 10 is comprised of sidewalls 14, junction box 10 having eight sidewalls which bestow an octagon shape to junction box 10. Of course, the prior art exhibits junction boxes having any number of shapes and forms. The sidewalls 14 (FIG. 1) are provided with a plurality of small holes 16 and two large holes (not fully shown), a portion of large hole 18 is shown in FIG. 1. The edges 20 which define the holes are bare and sharp.

A connector clamp 22 is fitted through large hole 18 and secured to the interior of the junction box 10. (A more elaborate discussion of connector clamp 22 will be subsequently provided in the discussion concerning FIG. 8). Connector clamp 22 has an annular face 24 which surrounds the periphery of large hole 18 and attaches to screw-nut clamp 26. Screw-nut clamp 26 has an upper clamping element 28 and a lower clamping element 30 which are attached to annular face 24. Positioned between the upper clamping element 28 and lower clamping element 30 is insulated wire 32 which is secured by screws 34 to connector clamp 22. Connector clamp 22 firmly secures the insulated wire 32 to junction box 10, with the insulated wire 32 extending into the interior of junction box 10.

Insulated wire 32 is provided with two electrical wires 36 and 38, which each have a thin rubber covering (not shown), surrounded by an insulation layer 40 of hard plastic, or rubber, or other insulative material. Of course, other types of insulated wiring such as insulated wiring containing a single wire or containing multiple wires may be used in conjunction with the present invention without deviating form the teachings contained herein.

Still with reference to FIG. 1, thinly insulated wires 42A and 42B enter the junction box 10 through a small hole 16 with the wires 42A and 42B resting upon edge 20. A top 44 of junction box 10 is securable and detachable to the sidewalls 14 by means of screws 46.

Figure 2:
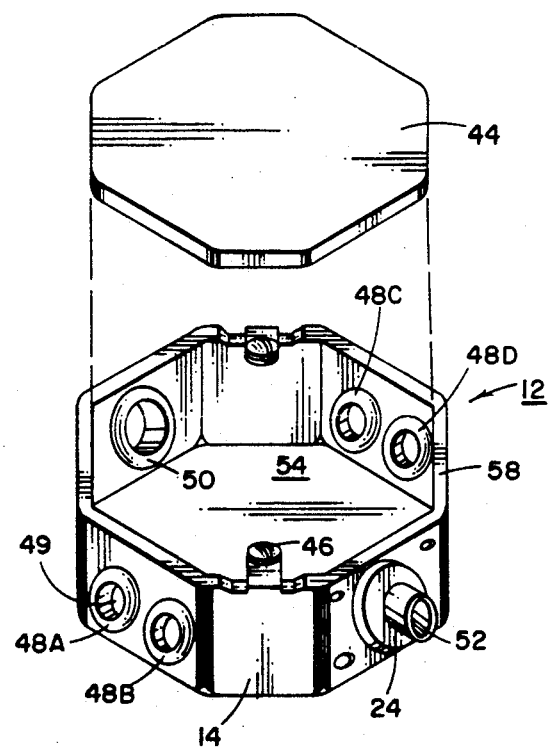
FIG. 2 is an exploded view of a junction box according to the present invention.

In FIG. 2, a junction box 12 according to the present invention is structurally similar to junction box 10 of FIG. 1. However, junction box 12 is provided with small hole cushions 48A, 48B, 48C, 48D which are positioned around the periphery of small holes 16. The hole cushions form an entry path such as entry path 49 of hole cushion 48A. In addition, a large hole cushion 50 is provided in a large hole on one of the sidewalls 14 of junction box 12. Furthermore, the junction box of FIG. 2 according to the present invention has a bottom insulation pad 54 which rests on the floor 56 (see FIG. 4) of junction box 12.

In FIG. 2 the upper and lower clamping elements 28 and 30 of connector clamp 22 are not shown so as to better illustrate how wire guard 52 according to the present invention extends into the interior of junction box 12, with wire guard 52 being positioned between the annular walls of annular face 24 of connector clamp 22. The exploded illustration of FIG. 2 demonstrates how top 44 can be removed to expose the interior of junction box 12 to allow easy installation of components. When attached to junction box 12 top 44 rests upon the top 58 of sidewalls 14 and is secured thereto by screws 46.

Figure 3:
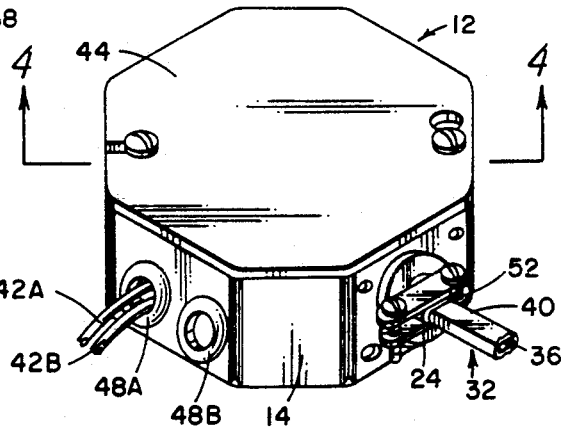
FIG. 3 is a perspective view of the junction box according to the present invention.

In FIG. 3, the top 44 of junction box 12 according to the present invention is attached to the sidewalls 14 be means of the screws 46. Hole cushion 48A protects thinly insulated wires 42A and 42B from the edge 20 (such as edge 20 of FIG. 1). In FIG. 3 the upper and lower clamping elements 28 and 30 of connector clamp 22 are attached to the exterior side of annular face 24. The wire guard 52 is positioned between the upper and lower clamping elements 28 and 30 and the insulated wire 32 is surrounded by the wire guard 52 so that the clamping elements 28 and 30 secure the insulated wire 32 to the junction box 12 but do not touch the insulated wire 32.

Figure 4:
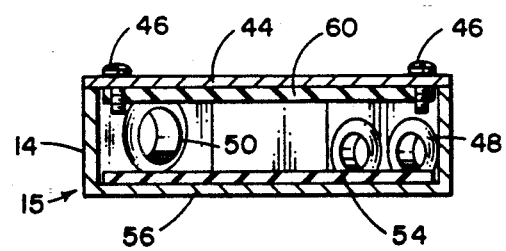
FIG. 4 is a cross-sectional illustration of the junction box of the present invention taken along line 4—4 of FIG. 3.

With reference to FIG. 4, a cross-sectional illustration taken along line 4—4 of FIG. 3 reveals that junction box 12 is comprised of a structure 15. Structure 15 is comprised of sidewalls 14 and a floor 56. Floor 56 and sidewalls 14 are integrally connected. Large hole cushion 50 and small hole cushion 48D are installed in the holes of the sidewall 14 and provide protection to any electrical wire which might enter the entry path which the hole cushions 50 and 48D provide. Bottom insulation pad 54 is made of rubber or a suitable substitute insulation material and contacts the interior surface of floor 56. Bottom insulation pad 54 can be affixed to the floor 56 by rubber cement or other appropriate bonding agent or simply be provided with a sticky surface which adheres to the interior surface of floor 56. Top insulation pad 60 contacts the top 44 of junction box 12 in a manner similar to the way insulation pad 54 contacts floor 56. As an alternative, no adhering material need bond the bottom and top insulation pads 54 and 60 to the floor 56 and top 44, respectively, so long as any wiring located inside of the junction box lie between the pads 54 and 60. Furthermore, the elastic nature of the insulation pads 54 and 60 allows the pads to adhere to the sidewalls 14 near the floor 56 and top 44 such that bonding agents are not really necessitated.

Wires which are located inside of the junction box 12 are protected by the hole cushions 48, 50 and by insulation pads 54 and 60. The insulation pads protect any wires from the interior surface of top 44 and floor 56. When the junction box is filled with wiring and the top 44 is screwed tightly to the sidewalls 14, great compressive forces act upon the wiring which could damage the wires and cause electrical shorts to occur were the insulation pads 54, 60, and hole cushions 48, 50 not present.

Figure 5:
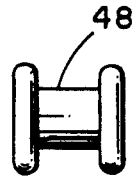
FIG. 5 is a side view of a rubber grommet which is used in the present invention.

In FIG. 5 one embodiment of a hole cushion 48 according to the present invention is illustrated, hole cushion 48 being a rubber grommet.

Figure 6:
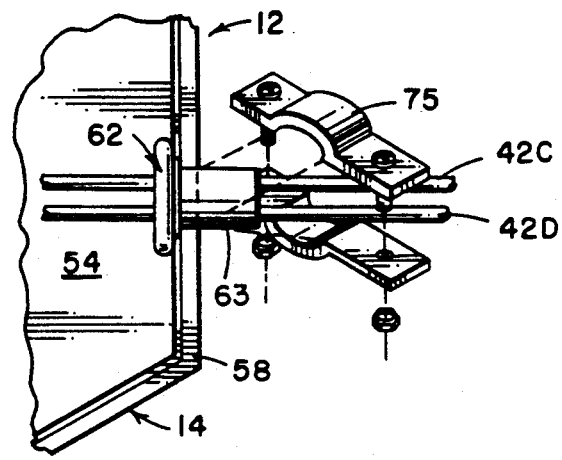
FIG. 6 is a top and partially exploded view of a section of the junction box of the present invention having a push-through nipple which can be used as an alternative to the rubber grommet of FIG. 5.

FIG. 6 is a top view which illustrates hole cushion 62 according to an alternative embodiment of the present invention. Cushion 62 can be used as an alternative to hole cushion 48. Hole cushion 62 is a one piece rubber nipple which can be easily inserted through the holes in the sidewalls 14 such as hole 18 (FIG. 1). Hole cushion 62 may be more accurately thought of as a push-through rubber nipple whose annular clamping region 63 is inserted through a hole in the sidewall 14 (FIG. 6) to expose region 63 to the exterior of the junction box 12. Hole cushion 62 forms an en path (not shown in FIG. 6) such as entry path 49 of FIG. 2. Thinly insulated wires 42C and 42D are inserted through the entry path of cushion 62 and extend from the exterior of junction box 12 into the interior of junction box 12. A clamp 75 is fastened to clamping region 63 and secures the electrical wires 42C and 42D to the junction box 12. Thus, the push-through nipple (cushion 62) and clamp 75 can be substituted for the connector clamp 22 of FIG. 1, with the clamping region 63 of cushion 62 providing added protection to the electrical wires 42C and 42D which extend into junction box 12. Of course, hole cushion 62 can be made any variety of sizes to accommodate any given sidewall hole.

Figure 7:
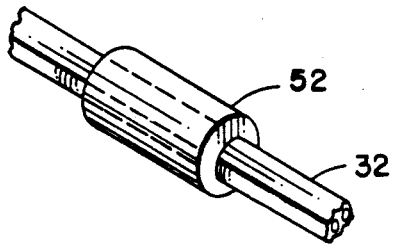
FIG. 7 is a schematic illustration depicting how a wire guard according to the present invention protects and surrounds electrical wiring.

FIG. 7 demonstrates how wire guard 52 surrounds insulated wire 32. Wire guard 52 is tubular in shape to allow insulated wire 32 to be easily inserted therethrough. Wire guard 52 is made of a vinyl plastic or other appropriate material which protects an insulated wire from pressure contact with rough and sharp edges.

Figure 8:
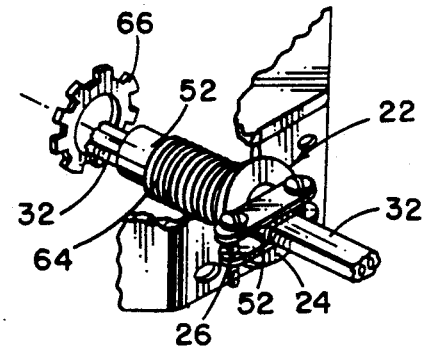
FIG. 8 is a schematic illustration depicting how the wire guard according to the present invention is used in conjunction with a connector-clamp device.

In FIG. 8, connector clamp 22 is comprised of annular face 24 to which is attached screw-nut clamp 26 on the exterior side of annular face 24. Connector clamp 22 is further comprised of an annular threaded portion 64 which is attached to the interior side of annular face 24. A wingnut 66 is screwed into the threaded portion 64 to secure the connector clamp 22 to a hole in a sidewall 14 of a given junction box (see junction box 10 and junction box 12 of FIGS. 1 and 3). The wire guard 52 not only protects the insulated wire 32 from direct contact with the upper and lower clamping elements 28 and 30 of the screw-nut clamp 26 but provides further protection in the interior of the junction box in that the wire guard 52 protects the insulated wiring from the potentially sharp threads at the interior side of threaded portion 64.

Figure 9:
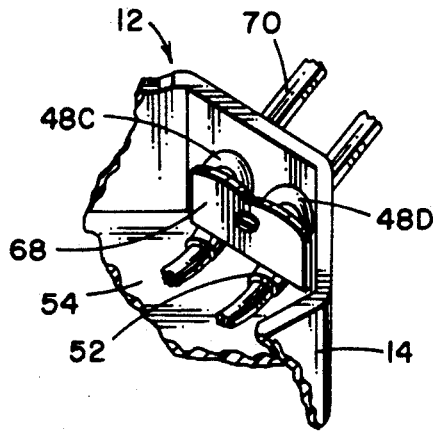
FIG. 9 is a schematic illustration depicting how the wire guard depicted in FIG. 7 is used in conjunction with an interior-mounted clamp device.

In FIG. 9 an interior clamp 68 is secured to the interior side of a sidewall 14 for purposes of securing insulated wires 70 to the junction box 12. The bottom insulation pad 54 protects the electrical wires 70 from contact with floor 56. As further protection to the wires 70, a wire guard 52 is placed over each of the wires 70. A wire guard 52 is positioned between the interior clamp 68 and the wires 70 to protect the wires from contacting interior clamp 68.

Utilization of the present invention will prevent the needless destruction of life and property. The junction box of the present invention is preferably made of metal as metal provides greater fire preventive properties than plastic. Round holes are preferable in the sidewalls of the junction box for the round shape allows easy insertion of hole cushions 48, 50, 62. However, the teachings of the present invention are applicable to other hole shapes. Furthermore, it is realized that the floor 56 and top 44 may be oriented in a wall or ceiling so as to actually represent the lateral side of the junction box. Therefore, the distance between the floor 56 and top 44 of junction box 12 should be considered as being less than the distance between opposite sidewalls of the junction box 12. Also, it is realized that the teachings of the present invention are applicable to electrical wall boxes.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. An electrical junction box, for reducing the risk of fire, having a floor integrally connected to a plurality of sidewalls, at least one sidewall of the plurality of sidewalls having a hole extending from an interior side of the at least one sidewall to an exterior side of the at least one sidewall, and a top connected to the plurality of sidewalls which is detachable therefrom, said electrical junction box further comprising:

a connector clamp having an annular face connected to the at least one sidewall at the periphery of the hole of the at least one sidewall, an exterior side of the annular face connected to a screw-nut clamp having upper and lower clamping elements, an interior side of the annular face connected to a tubular threaded portion of said connector clamp, a wingnut screwed into the tubular threaded portion securing said connector clamp to the at least one sidewall;

an insulated wire;

a wire guard connected to and surrounding said insulated wire, said wire guard connected to and positioned between the upper and lower clamping elements and extending through the hole of the at least one sidewall and through the interior of the threaded portion of said connector clamp;

a top insulation pad connected to the top of said junction box;

a bottom insulation pad connected to the floor of said junction box;

a second sidewall of said plurality of sidewalls having a hole extending therethrough; and a hole cushion connected to said second sidewall at the peripheral edge of the hole of said second sidewall.

2. An electrical junction box according to claim 1, further comprising:

a third sidewall of said plurality of sidewalls having a hole extending therethrough;

a push-through rubber nipple connected to the peripheral edge of the hole of said third sidewall and having an annular clamping region directed to the exterior of said junction box, said push-through nipple forming an entry path into said junction box;

a thinly insulated wire extending into said electrical junction box through the entry path formed by said push-through rubber nipple;

a clamp fastened to the clamping region of said push-through rubber nipple so as to secure said thinly insulated wire to said push-through rubber nipple.

3. An electrical junction box according to claim 2, further comprising:

a fourth sidewall of said plurality of sidewalls having a hole extending therethrough;

a second hole cushion connected to the fourth sidewall at the peripheral edge of the hole of said fourth sidewall;

a second insulated wire extending into said electrical junction box through said second hole cushion;

an interior clamp secured to the interior of the fourth sidewall;

a second wire guard connected to and surrounding said second insulated wire, said second wire guard contacting said interior clamp.

4. A junction box according to claim 3, wherein said hole cushion and said second hole cushion are rubber grommets.

5. A junction box according to claim 4 wherein said wire guard and said second wire guard are made of a vinyl plastic material.

* * * * *